United States Patent [19]
Bates et al.

[11] Patent Number: 5,973,663
[45] Date of Patent: Oct. 26, 1999

[54] VISUALLY AGING SCROLL BAR

[75] Inventors: Cary Lee Bates, Rochester; Jeffrey Michael Ryan, Byron, both of Minn.

[73] Assignee: International Business Machines Corporation, Armonk, N.Y.

[21] Appl. No.: 08/061,642

[22] Filed: May 12, 1993

Related U.S. Application Data

[63] Continuation of application No. 07/777,867, Oct. 16, 1991, abandoned.

[51] Int. Cl.⁶ .................................................. G09G 5/34
[52] U.S. Cl. ........................... 345/123; 345/273; 345/274
[58] Field of Search ................................... 340/726, 724, 340/703, 793, 701; 395/131, 155; 364/419; 345/123, 124, 125, 973, 974

[56] References Cited

U.S. PATENT DOCUMENTS

| | | | |
|---|---|---|---|
| 4,704,699 | 11/1987 | Farina et al. ............................ | 340/703 |
| 4,831,556 | 5/1989 | Oono ..................................... | 340/721 |
| 4,868,496 | 9/1989 | Havel .................................... | 340/753 |
| 4,896,291 | 1/1990 | Gest et al. .............................. | 340/724 |
| 5,185,698 | 2/1993 | Hesse et al. ............................ | 364/419 |
| 5,339,391 | 8/1994 | Wroblewski et al. ................... | 345/123 |

FOREIGN PATENT DOCUMENTS

| | | | |
|---|---|---|---|
| 60-107109 | 12/1985 | Japan .................................... | 340/722 |
| 368997 | 3/1991 | Japan .................................... | 340/724 |
| 2137788 | 10/1984 | United Kingdom ............ | G09G 3/36 |
| 2217080 | 10/1989 | United Kingdom ................... | 340/793 |

OTHER PUBLICATIONS

Research Disclosure vol. 316, No. 01, Aug. 1990, Emsworth GB "Design of dynamically updated icon to depict labor standard range" *the whole document*.

IBM Technical Disclusure Bulletin. vol. 33, No. 3B, Aug. 1990, New York US pp. 31–32 "Min–Max slider" *the whole document*.

Research Disclosure vol. 297, No. 50, Jan. 1989, New York US "Visual scaling technique for scrolling bars".

Graphical Method of Indicating the Position of and Performing an Operation on a Plurality of Selected Objects in a Computer System, U.S. application No. 07/619,628, Torres et al., filed Nov. 28, 1990.

Scrollbar Having System or User Provided Information, U.S. application No. 07/531,213, Cina et al., filed May 31, 1990.

"Visual Scroling Technique for Scrolling Bar" D.F. Murray and R.J. Torres, Jan. 1989.

*Primary Examiner*—Amare Mengistu
*Attorney, Agent, or Firm*—Steven W. Roth

[57] ABSTRACT

A visually aging scroll bar is associated with a window or viewport on a computer display as part of a computer system, and contains a slider to indicate relative positioning in the window of a document, such as a data file, image file, audio file, text file, or spreadsheet. The current position of the scroll bar slider is monitored by the computer system. After a first predetermined sampling period has elapsed, a first region matching the current position of the scroll bar slider is created. The visual appearance of the region is determined by a predetermined region heating rate. For example, a newly created region starts at "cold", which can be indicated by a violet-indigo color. After a second sampling period has elapsed, the computer system again checks the current position of the scroll bar slider. If the current position still matches the first region, the visual appearance of the first region symbolically "warms up" as indicated by the region heating rate. This incrementally changing visual appearance (for example, from violet to indigo, blue, green, yellow, orange and finally a deep red) continues for as long as the current slider position matches the first region, up until a maximum region symbolic "temperature" is reached.

20 Claims, 9 Drawing Sheets

```
           Scroll Bar Parameters
   Aging Scroll Bar        X ON    _OFF
   Minimum Document Size      __300_ lines
   Sampling Rate              __20_  seconds
   Region Heating Rate        _10    degrees
   Region Cooling Rate        __5    degrees
   Maximum Region Temp        100    degrees
   Suspend Sampling?          _ YES    X NO
   Save Regions?              X YES    _ NO
   Exposure Mode              X DIRTY  _ SLIDER
```

FIG. 4A

| Temperature | Visual Appearance | Color Name |
|---|---|---|
| 0 |  | Violet |
| 10 |  | Violet-Indigo |
| 20 |  | Indigo-Blue |
| 30 | 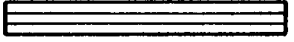 | Blue |
| 40 | 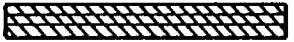 | Blue-Green |
| 50 | 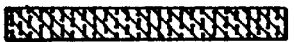 | Green-Yellow |
| 60 |  | Yellow |
| 70 |  | Yellow-Orange |
| 80 |  | Orange-Red |
| 90 |  | Red |
| 100 |  | Dark Red |

Change Scroll Bar Colors

FIG. 4B

VISUALLY AGING SCROLL BAR

This is a continuation of application Ser. No. 07/777,867, filed on Oct. 16, 1991, now abandoned.

FIELD OF THE INVENTION

This invention relates to the data processing field. More particularly, this invention relates to a scroll bar associated with a display window that provides a view into a presentation space.

BACKGROUND OF THE INVENTION

In the early days of the personal computer, browsing or editing a document was difficult to do. The document would often take up several screens worth of information, and it was difficult for the user to find specific sections of the document. The user would often have to scroll through an entire document screen by screen by pressing function keys assigned to a "scroll up" and "scroll down" function in an often futile attempt to find a specific section. This was slow and cumbersome, and resulted in many users printing off the entire document instead of trying to view it on the display. This was a waste of valuable natural resources, and was a giant step backwards in the often expressed goal of reaching a paperless office.

Some early editors attempted to partially solve this problem by providing a "search" or "find" function. While somewhat helpful, these functions depended on a user knowing a specific (and reasonably unique) word or string of words that is contained in the specific section he is looking for. This approach often turned into a guessing game for a user, and often resulted in the User again giving up and printing off the entire document. In addition, many users simply did not know (or couldn't remember) any specific word or string of words in the section they were looking for.

It was thought that problems like the above would be solved by a great panacea called a "graphical user interface", first introduced to the market by Apple, and later adopted by Microsoft with its "Windows" program and by IBM with OS/2 and Presentation Manager. One common feature of these graphical interface programs is a scroll bar. A scroll bar is commonly associated with a display window, and is most useful when only a small portion of a document can be displayed in a display window at any one time. The scroll bar contains what is known as a "slider". The slider's relative position in the scroll bar graphically indicates the relative position of the entire document that is currently displayed in the display window. One scroll bar is often used to indicate relative vertical position, while a second scroll bar can be used to indicate relative horizontal position.

A scroll bar is normally used in conjunction with an input device such as a mouse, track ball, or light per. When a user wants to move to a different section of a document, he can either move the mouse cursor to a new position on the scroll bar (click operation), or can place the mouse cursor on the slider, press and hold one of the mouse buttons, and move the mouse cursor either one side or the other of the slider (drag operation). While both of these operations are helpful in rapidly moving from one section of a document to another section, they don't do much to help a user find the specific section of the document he is looking for.

Some techniques are known in the art to enhance the operation of a scroll bar to make it easier for a user to find a specific section he is looking for. One such technique is described in pending patent application Ser. No. 07/531,213, filed on May 31, 1990 by the assignee of this invention and entitled "Scrollbar Having System or User Provided Information". This application discloses displaying indicia such as alphanumeric symbols within a scroll bar to assist a user find a specific section in a document. For example, if the document contained in the window was a dictionary, the scroll bar disclosed in this application could contain some or all of the letters "A" through "Z". If the user wanted to look up a specific word that started with "P", for example, he could simply move the mouse cursor to the "P" portion of the scroll bar and click on the mouse button. While this technique is very useful in making it easier to find a specific section in a document, it is quite complex and highly dependent on the contents of the document itself, since different documents would require that different indicia be displayed in the scroll bar to be useful. In addition, documents such as image or data files are not organized in a manner that would allow this technique to be used.

Another technique for enhancing the operation of a scroll bar is described in pending patent application Ser. No. 07/619,628, filed on Nov. 28, 1990 by the assignee of this invention and entitled "Graphical Method of Indicating the Position of and Performing an Operation on a Plurality of Selected Objects in a Computer System". This application discloses placing a marker icon in a scroll bar when an object in a window is selected. This technique makes it easier for a user to quickly scan previously visited areas of a document. While helpful, this technique loses much of its effectiveness if multiple areas of a document are selected, since the scroll bar quickly fills up with marker icons that have less and less meaning. In addition, this technique contains no indication as to when, how long, or how often a specific area of the document has been viewed.

SUMMARY OF THE INVENTION

It is a principal object of the invention to enhance the operation of a scroll bar.

It is another object of the invention to provide an enhanced scroll bar so that users are able to quickly locate a specific section of the document.

It is another object of the invention to provide an enhanced scroll bar that makes it easier for a user to find a specific section of the document that has been viewed frequently or for long periods of time.

These and other objects are accomplished by the visually aging scroll bar disclosed herein. A visually aging scroll bar is associated with a window or viewport on a computer display as part of a computer system, and contains a slider to indicate relative positioning in the window of a document, such as a data file, image file, audio file, text file, or spreadsheet. The current position of the scroll bar slider is monitored by the computer system. After a first predetermined sampling period has elapsed, a first region matching the current position of the scroll bar slider is created. The visual appearance of the region is determined by a predetermined region heating rate. For example, a newly created region starts at "cold", which can be indicated by a violet-indigo color.

After a second sampling period has elapsed, the computer system again checks the current position of the scroll bar slider. If the current position still matches the first region, the visual appearance of the first region symbolically "warms up" as indicated by the region heating rate. This incrementally changing visual appearance (for example, from violet to indigo, blue, green, yellow, orange and finally a deep red) continues for as long as the current slider position matches the first region, up until a maximum region symbolic "temperature" is reached.

As the user moves the slider of a scroll bar, the scroll bar becomes "dirty" as an indication of where the user has been previously. Portions of the document with high usage are represented by "hotter" colors (reds & yellows) on the scroll bar. Portions of the document with low usage are represented by "cooler" colors (blues & greens) on the scroll bar. This visually aging scroll bar makes it very easy for a user to return to previously visited portions of the document.

If the current position has moved outside of the first region, a second region is created containing the new current position. As long as the current position remains in the second region, the color of the first region is "cooled" by a predetermined region cooling rate, while the color of the second region is "warmed" by a predetermined region heating rate. This continues until the temperature of the first region is reduced to a minimum region temperature and its color disappears (by becoming the same color as the underlying scroll bar), and until the temperature of the second region reaches a maximum region temperature.

The computer system continues to monitor the current position of the scroll bar slider as long as the document is in use, or until a suspend sampling indication is received from the user. Once work on the document is completed, the computer system saves the present state of all active regions of the scroll bar in storage for the next time the document is used.

BRIEF DESCRIPTION OF THE DRAWING

FIGS. 4A–4B show exemplary screens used to set scroll bar parameters and change color selections.

DESCRIPTION OF THE PREFERRED EMBODIMENT

Co-pending U.S. patent application entitled "Non-Linear Scroll Bar", Ser. No. 07/777,842 commonly assigned and filed on even date herewith, is related to this patent application and is hereby incorporated by reference.

Figure 1:
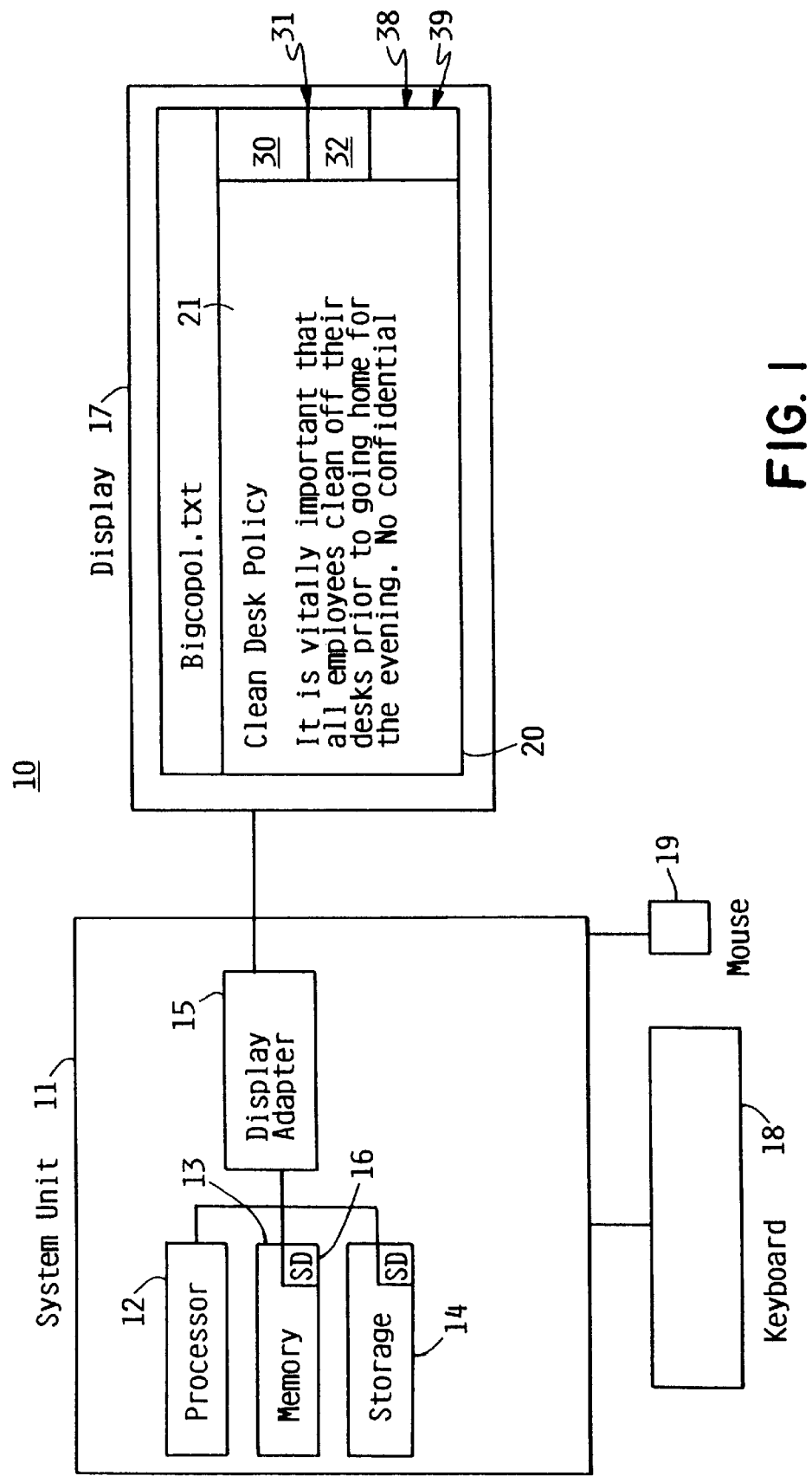
FIG. 1 shows a block diagram of the computer system of the invention.
Figures 1, 5A:
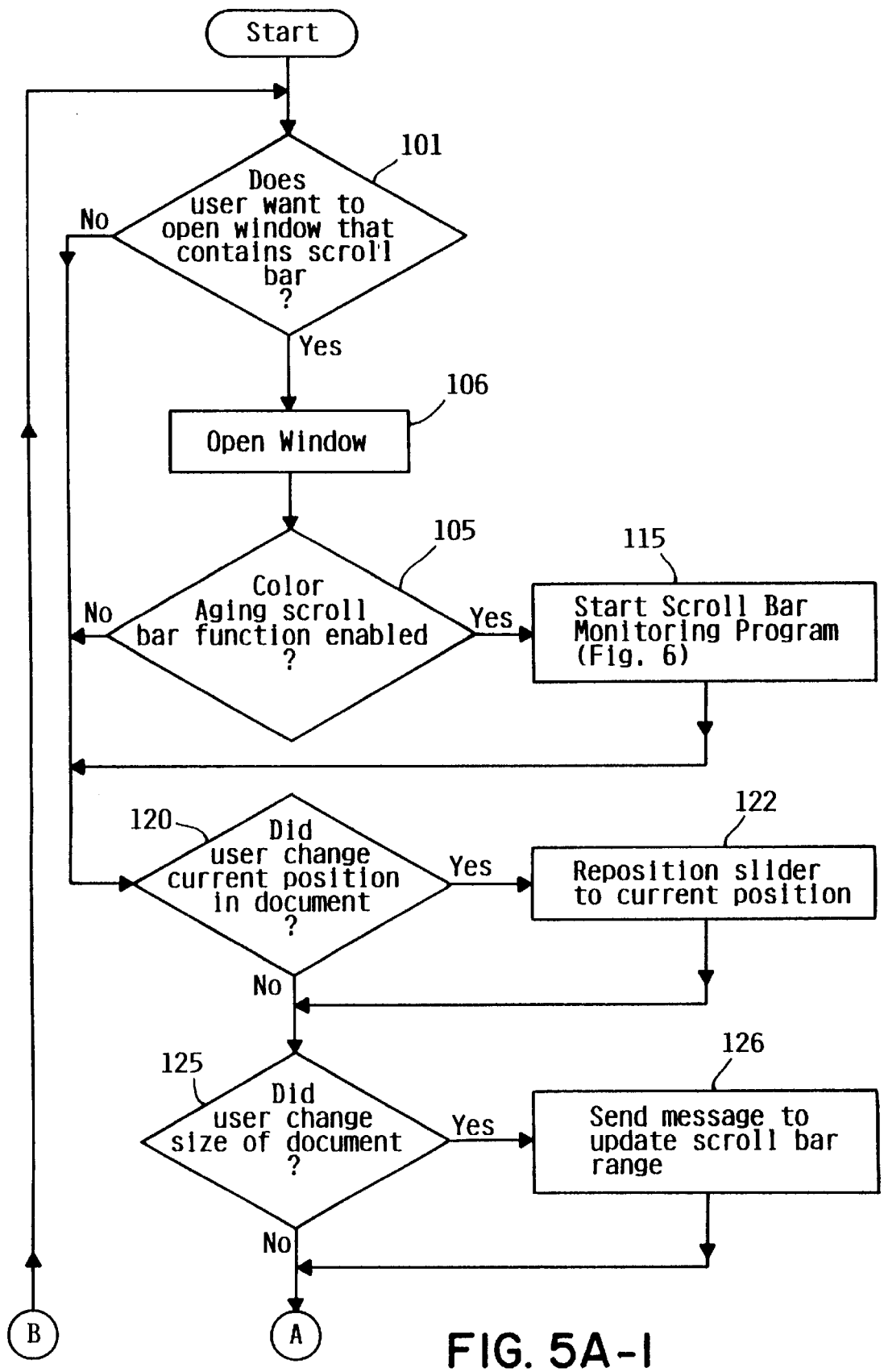

FIG. 1 shows a block diagram of computer system 10 of the invention. Computer system 10 has display 17, keyboard 18, and input device 19, each of which is connected to system unit 11. System unit 11 contains processor 12 connected to memory 13, storage 14, and display adapter 15. Processor 12 is suitably programmed to carry out this invention, as described in more detail in the flowcharts of FIGS. 5 and 6.

In the preferred embodiment, computer system 10 is an IBM PS/2, where processor 12 is an Intel 80386 microprocessor. Display adapter 15 is an IBM 8515 display adapter, and display 17 is an IBM 8515 display. Input device 19 is preferably an IBM mouse but may also be a track ball, light pen, or other input device. Storage 14 is a magnetic hard disk file and contains operating system software, preferably OS/2 with Presentation Manager but optionally Microsoft Windows 3.0, as well as preferably one or more OS/2 application programs such as Word Perfect or optionally DOS application programs such as Microsoft Word for Windows. When running, these programs are partially or completely installed in memory 13 and executed by processor 12.

Computer system 10 could also be another type of computer system, whether it be another microcomputer such as an Apple Macintosh, a minicomputer such as an IBM AS/400, or a mainframe computer such as an IBM System/390, and still fall within the spirit and scope of this invention. In addition, computer system 10 can be a microcomputer such as described above, connected to a larger computer system such as an IBM AS/400.

Display 17 contains window 20. For the purposes of this invention, a "window" or viewport can occupy anywhere from substantially all of the display screen to a very small portion of the display screen, and may be displayed in conjunction with (possibly overlaying portions of) other windows in a multi-tasking environment such as OS/2, or be by itself in a single-tasking environment such as DOS. A portion of document 21 is displayed in window 20. Hereinafter, the name "document" shall be used to refer to any data file, text file, image file, audio file, spreadsheet, etc., that cannot be fully displayed or otherwise represented in window 20. Window 20 also contains scroll bar 30. Scroll bar 30 has slider 32. The relative position of slider 32 in scroll bar 30 indicates the relative position of document 21 currently displayed in window 20.

For illustrative purposes, document 21, a portion of which is shown in window 20 of FIG. 1, is part of a Policy and Procedures manual for a hypothetical large corporation. Our hypothetical large corporation has deemed that this manual be reviewed on a regular basis by all employees. To save paper, employees must review the document on-line and must not even think about printing off the whole document.

Figure 2:
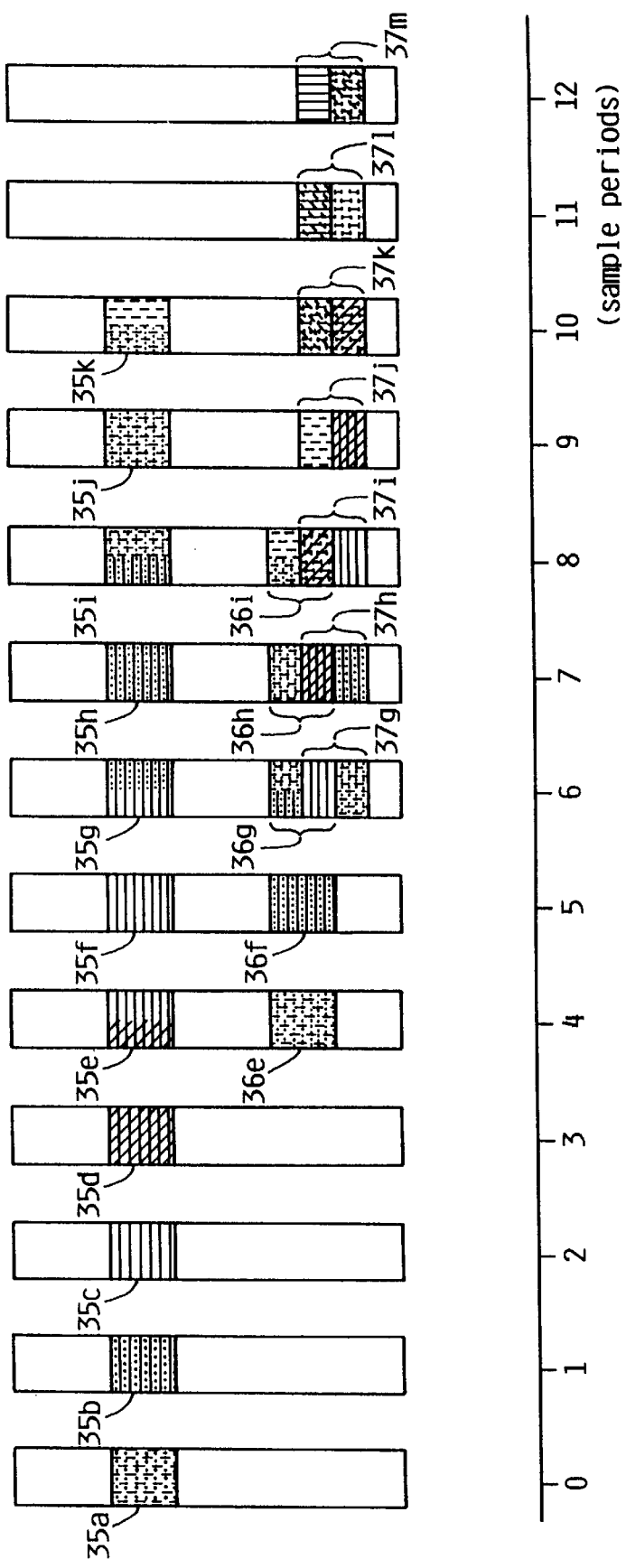
FIG. 2 shows how aging regions of a scroll bar are created and incrementally change their visual appearance based on the current position of the scroll bar slider.
Figure 3A:
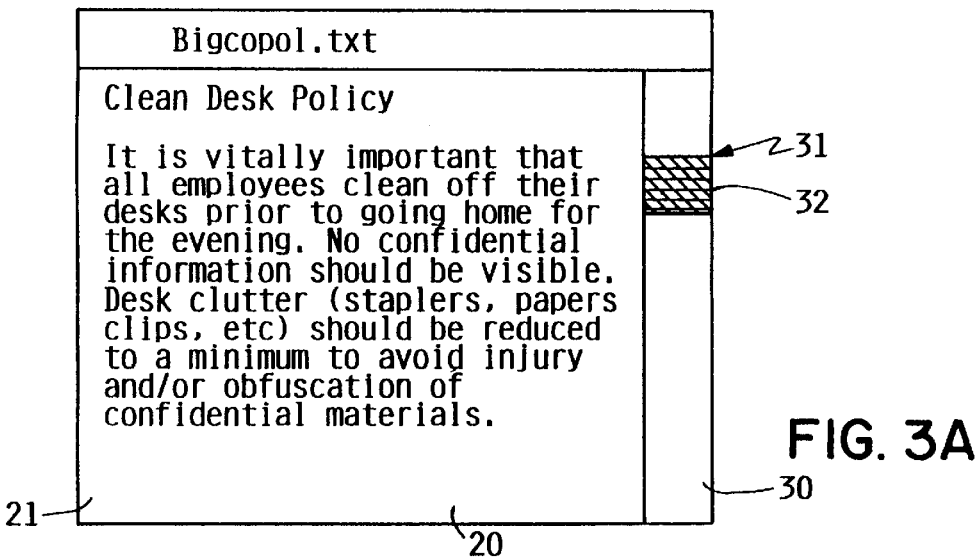
FIG. 3 shows how a specific section of a document that has been used for a period of time can be found again by examination of the visual appearance of the scroll bar slider.

FIG. 2 shows how aging regions of a scroll bar are created and incrementally change visual appearance based on the current position in a document, as a function of elapsed time. This figure will be discussed in conjunction with FIGS. 3A–3C and FIGS. 4A–4B. For purposes of illustration, let's assume that our user is reviewing the Policy and Procedures manual. The document is linearally represented through the scroll bar. For example, if a user wanted to go to the middle of section 5 of the manual, he would use a drag operation to move his mouse pointer to point 31 of scroll bar 30. Slider 32 would move to point 31 on scroll bar 30. FIG. 3A shows the section of document 21 visible to our user in window 20, and shows the location of slider 32 at point 31 of scroll bar 30.

FIG. 2 shows how a first region is created and displayed on scroll bar 30 in the preferred embodiment of the invention. The position of slider 32 is the "current position". After a first sampling rate has elapsed (set to be 20 seconds, as shown in FIG. 4), the first region for this document is created, as shown by the reference numeral 35b. Region 35b has an upper and a lower boundary that match the upper and lower boundaries of the current position of slider 32. The initial region color is determined by the specified region heating rate, as mapped to the available colors in the computer system. For example, if the computer system is capable of displaying 256 colors, some or all of these colors are arranged in order from "cold" to "hot", preferably by following the light spectrum in reverse order (violet, indigo, blue, green, yellow, orange, red).

Those skilled in the art understand that the use of the terms "temperature", "heating" and "cooling" throughout this description are meant to be symbolic indications of usage and not actual physical changes of thermal characteristics of the scroll bar, display, or computer system. Therefore, "temperature", "heating", and "cooling" shall be deemed short hand representations of "symbolic temperature", "symbolic heating" and "symbolic cooling", respectively.

The preferred embodiment allows the user to select indicators of symbolically warmer and cooler temperatures, such as by changing the default colors, as is shown in FIG. 4B. This feature would be particularly advantageous to color-blind users. Those skilled in the art realize that in the event the display attached to the computer is unable to display a wide range of colors (i.e. a monochrome display), the different temperature levels can be represented by gray scales or other forms of shading and still fall within the spirit and scope of this invention. In our example, a 10° region heating rate has been specified, as shown in FIG. 4A. Therefore, region 35b is initially a violet-indigo color.

Another 20 seconds goes by. Since our user is reading this section of the document carefully, he has not moved the slider from this portion of the document. Since the current position of the document is still within the first region, the color of the first region becomes "warmer" by the amount of the predetermined region heating rate. Since a 10° region heating rate was specified (FIG. 4A), the color of the first region changes from violet-indigo to indigo-blue.

Regions 35c and 35d show the region changing color from indigo-blue to blue to blue-green as two more sample periods elapse (as indicated in the monochrome environment of a patent drawing by increasingly darker shading).

Figure 3B:
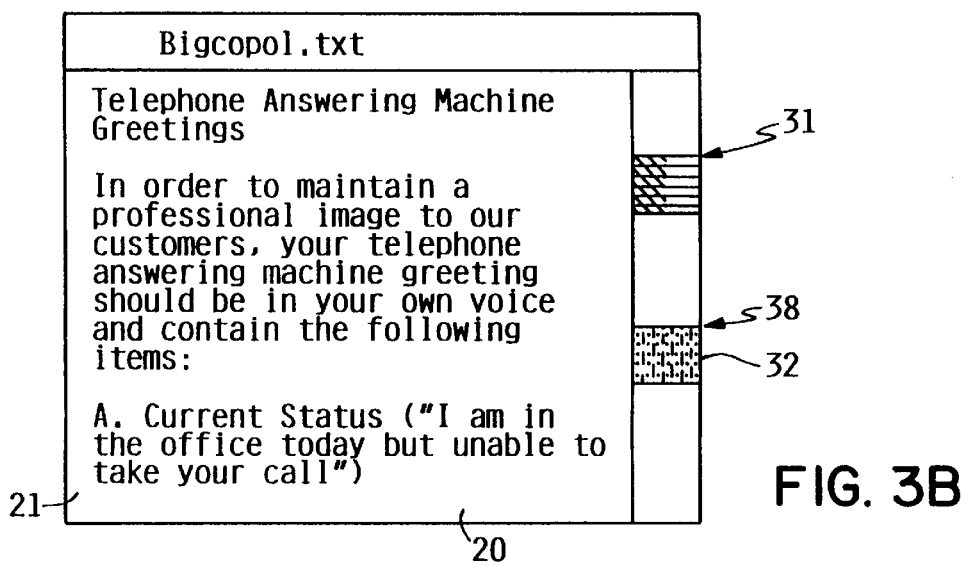
Figure 3C:
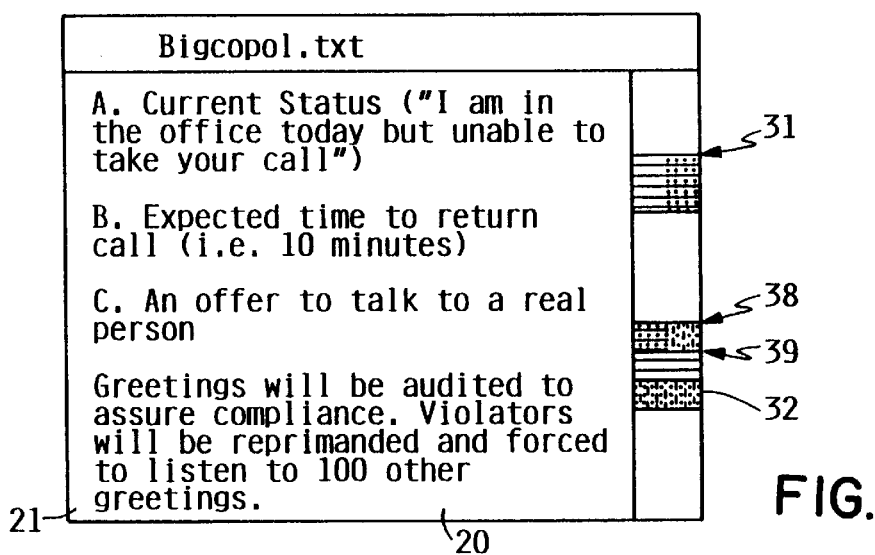

Our user now wants to take a look at another section of the manual. He moves his mouse pointer (via a drag operation in the preferred embodiment) down to point 38 of scroll bar 30 (FIG. 3B). The current position of the slider moves to this point and the portion of the document now displayed to our user is shown in FIG. 3B. Another 20 seconds goes by. A second region for this document is created, as shown by the reference numeral 36e. The initial color of region 36e is again determined by the specified region heating rate. In our example, this color is again violet-indigo. Since the current position is no longer in the first region, the color of the first region "cools down" by the region cooling rate of 5° specified in FIG. 4A. Therefore, the color of our first region changes slightly from blue-green to a color closer to blue.

Our user stays at this position for one more sample period as shown by regions 35f and 36f. Our user then moves the slider down slightly to point 39 (FIG. 3B). Since this move changed the current position of the slider, a new region is created at the next sampling period (region 37g) that overlaps region 36g. Note that the overlapping portion of these regions has a "warmer" color than the non-overlapping portions, and is indicated by the color associated with the temperature of the overlapping regions added together. This correctly identifies the overlapping portion of the region as a "hotter" part of the document (i.e., one with higher usage) and makes this portion easier to find.

FIG. 2 shows how regions 35 and 36 continue to cool down as our user stays at point 39, while region 37 continues to warm up. When a region cools down to 0°, it effectively disappears by becoming the same background color as the scroll bar (violet, in the preferred embodiment). The last sample time period in FIG. 2 shows that regions 35 and 36 have disappeared, while region 37 has become a yellow-orange color.

FIG. 4A shows the scroll bar parameters, most of which have been previously discussed. These parameters are normally assigned default values, but can be presented to the user upon demand for possible modifications. The first parameter asks whether the aging scroll bar should be on or off. There may be instances where the user would prefer that the scroll bar operate in a conventional (non-aging) fashion. The next parameter specifies a minimum document size. Since many of the advantages of an aging scroll bar are lost with small documents, this function is disabled for documents smaller than the specified minimum size. The next three parameters—sampling rate, region heating rate, and region cooling rate, have already been discussed. Completely different results can be obtained based on how these parameters are selected. This flexibility can be used to closely fit a user's specific situation. For example, if it is desirable to have regions change color very slowly over time, a user might want to set a sample rate of 5 minutes and a region heating rate of 1°.

The next parameter asks if a user wants to suspend sampling. This parameter can be selected via the screen shown in FIG. 4, or a special key sequence can be set up to toggle this parameter on or off. This parameter could be quite useful to minimize the effects of bathroom breaks or other interruptions on the aging nature of the scroll bar. The next parameter asks if the regions created during the viewing of this document should be saved when the document is no longer in use. If so, historical information about how the document has been used is maintained from session to session, and the temperature of the regions are written to storage 14 of FIG. 1. If not, all regions are erased when the document is exited, and the scroll bar is initialized to its background color the next time this document is accessed.

The last parameter asks if the user wants to use the scroll bar exposure mode or the slider exposure mode. The scroll bar exposure mode is what has been discussed thus far, where the scroll bar becomes "dirty" as portions of the document are visited. In this mode, the slider is at least partially transparent so as not to cover the colors of the regions in the scroll bar. The slider exposure mode changes the color of the slider as it passes over the various regions. The colors of the regions themselves are not displayed on the scroll bar until the slider is directly overhead.

Figures 2, 5A:
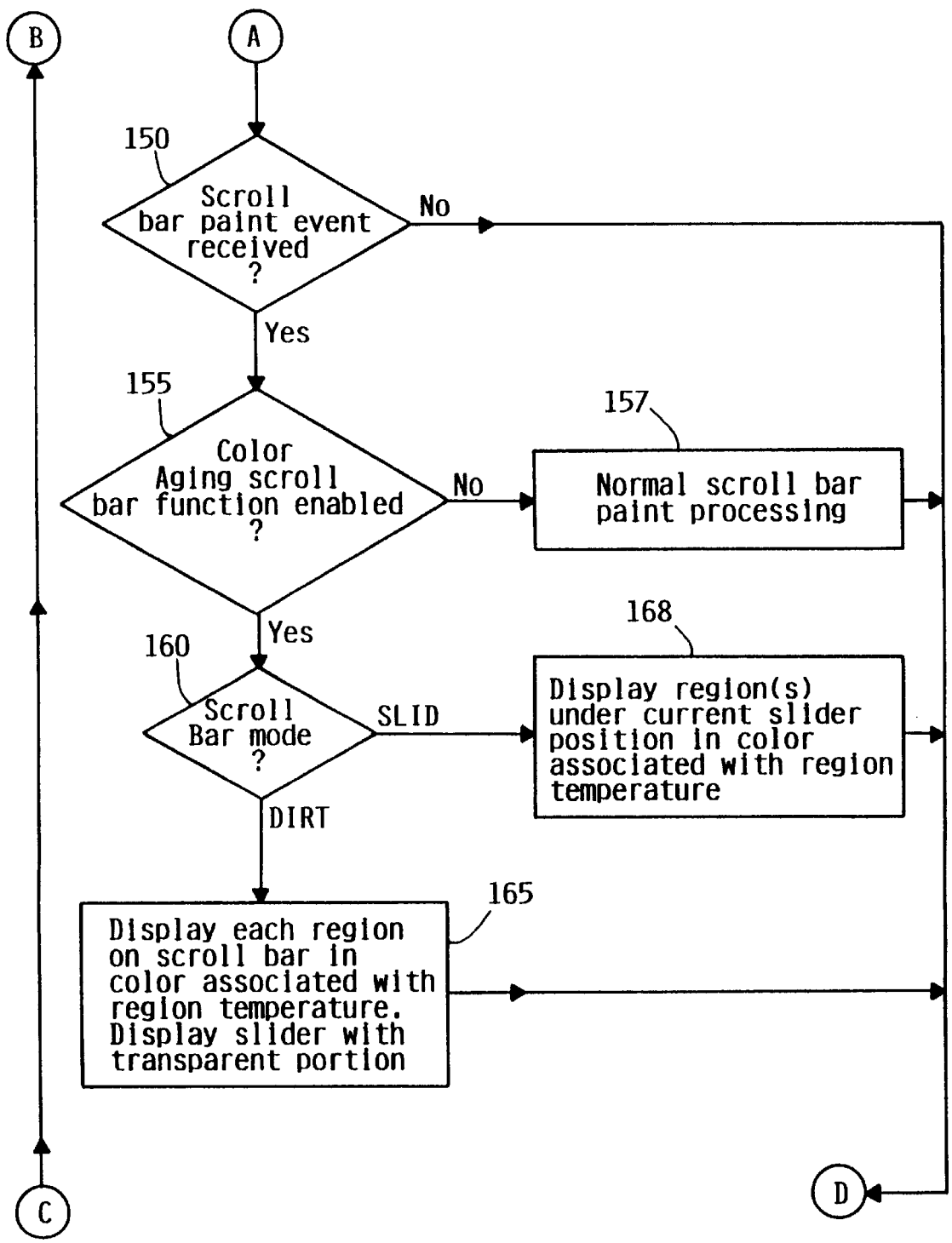
Figure 5B:
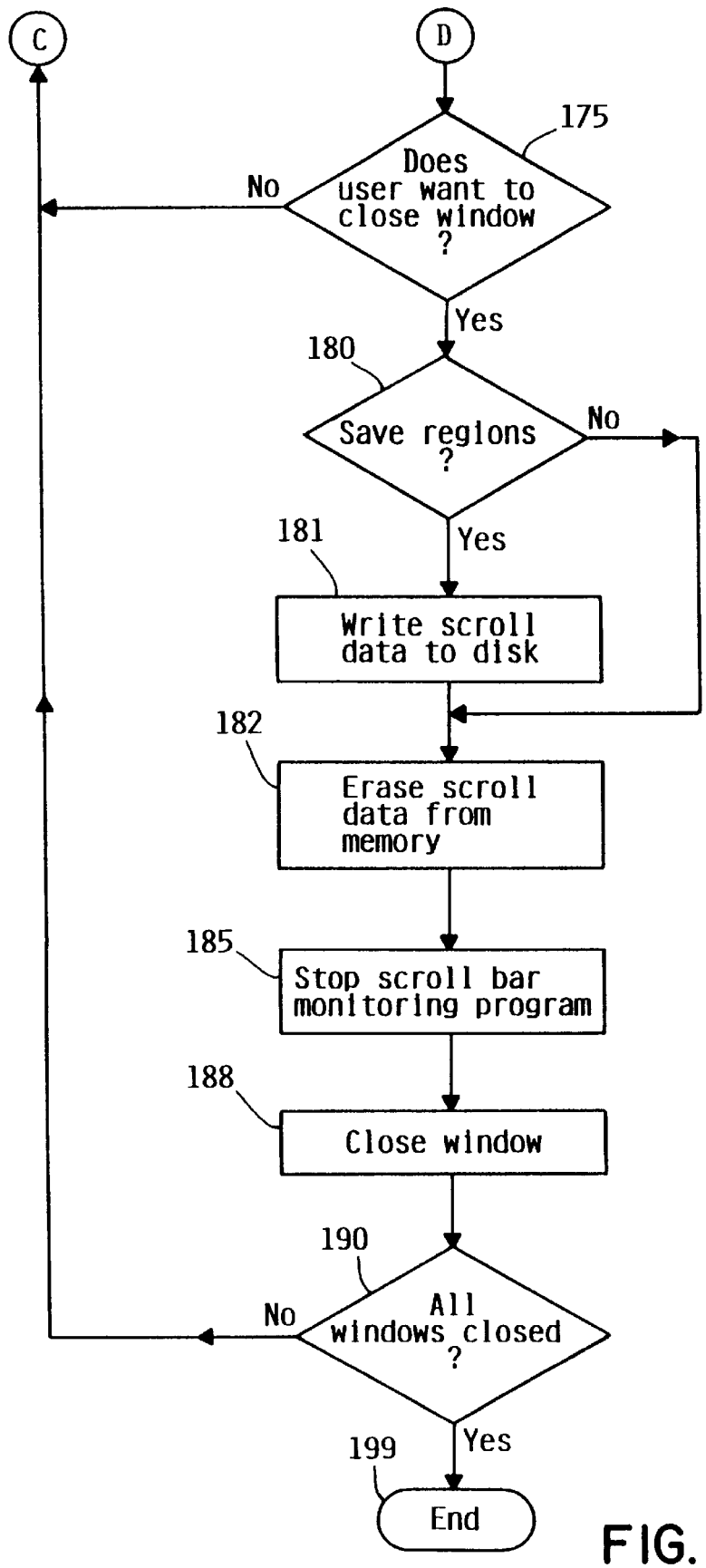
FIGS. 5–6 show the flowcharts of the operation of the scroll bar of the invention.
Figure 6A:
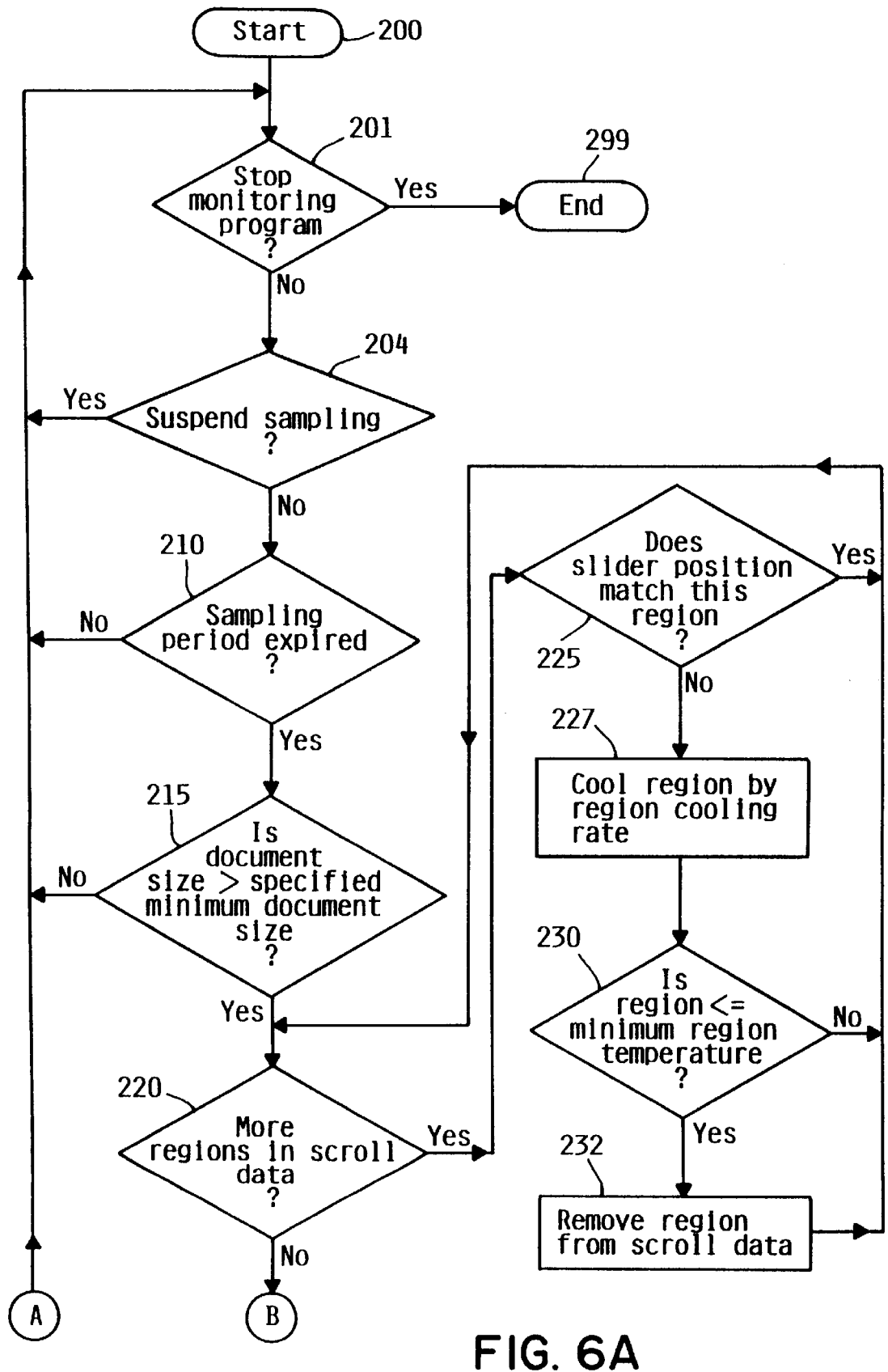
Figure 6B:
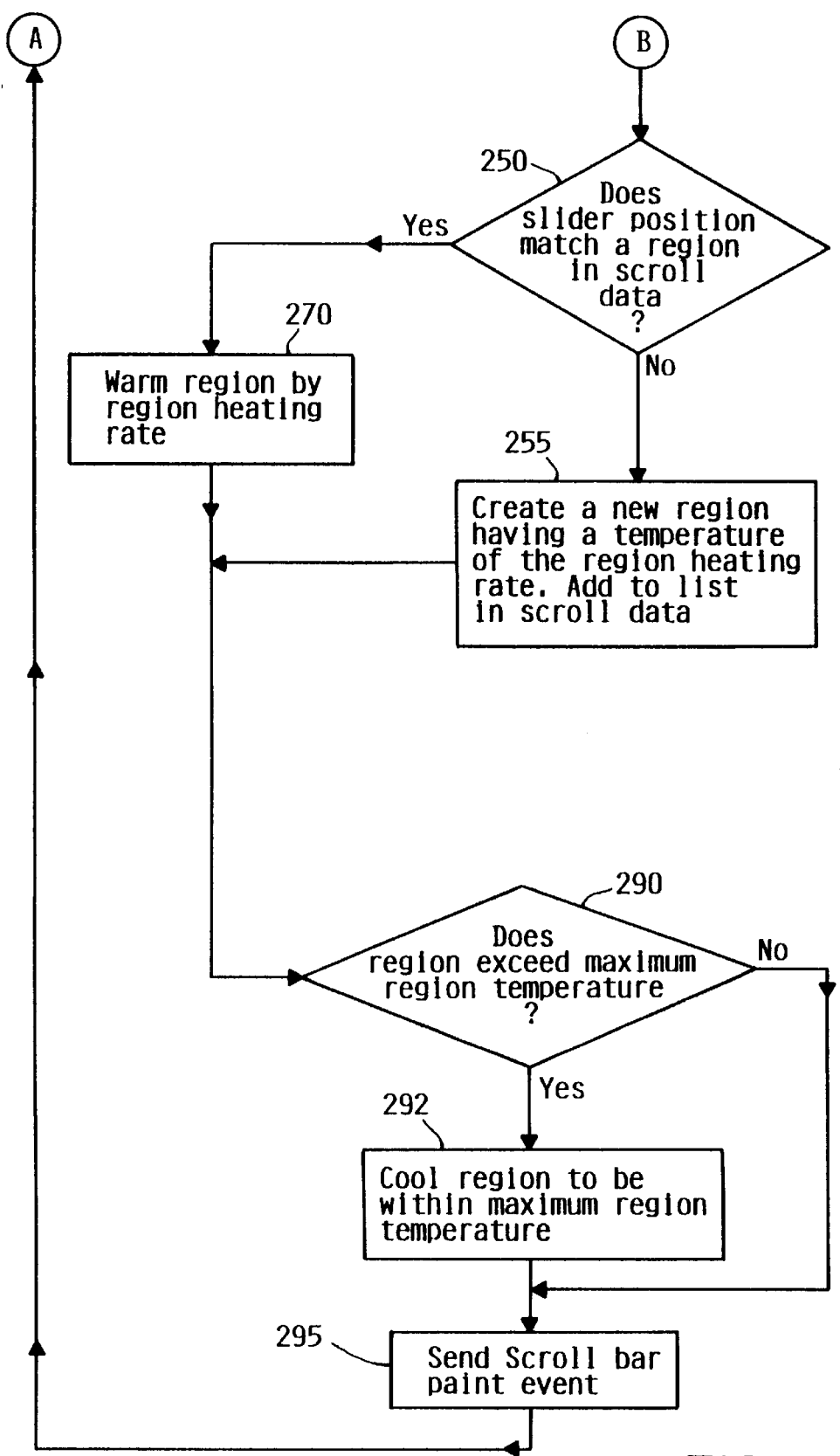

The operation of this invention, as shown in the flowcharts of FIGS. 5–6, will now be described in more detail. Referring now to FIG. 5, block 101 asks if the user has requested that a window be opened that contains a scroll bar. If so, block 106 opens the window in a conventional manner. In the preferred embodiment, Presentation Manager performs this step. Block 105 checks to see if the aging scroll bar function (FIG. 4) is enabled. If so, block 115 starts the scroll bar monitoring program, shown in FIG. 6. Note that the program shown in FIG. 5 executes concurrently with the program shown in FIG. 6.

Referring now to FIG. 6, block 201 checks to see if block 185 of FIG. 5 has indicated that the monitoring program should be stopped. If so, the program ends in block 299. If not, block 204 checks to see if it has received an indication from the user (FIG. 4) that the sampling should be suspended. If such an indication has been received, the program loops back to block 201. If no such indication has been received, flow of control moves to block 210. Block 210 checks to see if the sample period specified in FIG. 4 has elapsed. If not, flow of control goes back to block 201. If a sample period has elapsed, block 215 checks to see if the document size (determined by Presentation Manager) is greater than the minimum document size specified in FIG. 4. If not, flow of control goes back to block 201. The program could optionally end if block 215 is answered negatively, but since a document could start off smaller than the minimum document size but grow bigger than the minimum document size as it is edited, it is more appropriate to loop through blocks 201, 204, 210, and 215 checking for this condition.

If block 215 is answered positively, block 220 checks a portion of memory 13 referred to as "scroll data" to see if one or more regions are specified for this document. If there is no "scroll data" in memory 13, block 220 checks to see if there is any "scroll data" in storage 14 saved from a previous session with this document (block 181 of FIG. 5B). If there is "scroll data" in storage 14, this "scroll data" is copied into memory 13. "Scroll data" contains the upper and lower boundaries and the current "temperature" of each region.

If a region is specified in scroll data, this region is passed on to block 225. Block 225 checks to see if the current slider position matches this region. In the preferred embodiment, the slider must have exactly the same boundaries as this region, since overlapping regions are supported and are an important aspect of this invention. If so, flow of control goes back to block 220 to look for more regions, effectively skipping this region. If not, it is appropriate to "cool" the temperature of this region, since the current slider position does not match this region. Block 227 cools this region by the region cooling rate. For example, if our region was 400, block 227 would cool it down to 35°, thereby changing the color from blue-green to a color closer to blue.

Block 230 checks to see if this region is now cooler than or equal to a predetermined minimum region temperature. In the preferred embodiment, the minimum region temperature is "hard coded" to be zero, although this could be another user-defined scroll bar parameter such as those shown in FIG. 4. If block 230 is answered affirmatively, block 232 removes the region from scroll data. In either event, flow of control returns back to block 220, where the next region is passed to block 225. When block 220 determines that all the regions contained in scroll data have been processed, flow of control moves to block 250.

Block 250 asks if the current slider position matches any of the regions designated in scroll data. For example, if the current slider position has lower and upper boundaries at line 400 and line 500 of the document, block 250 would check the regions specified in scroll data to see if any of them have boundaries that match this slider position. If not, a new region needs to be created. Block 255 creates a new region having a temperature of the region heating rate specified in FIG. 4. For example, if a region heating rate of 10° was specified, this region would warm from 0° to 10° and change color from violet to violet-indigo. This newly created region is added to the list of regions contained in scroll data.

If block 250 indicates that the current slider position matches a region designated in scroll data, this means that a region has already been created and it needs to be warmed up.

Block 270 warms the region by the region heating rate specified in FIG. 4. For example, if the region that matches the slider position was at 20°, block 270 would warm it to 30°, and the color of this region would change from indigo-blue to blue.

Regardless of how block 250 is answered, block 290 ultimately checks to see if the region created exceeds the maximum region temperature specified in FIG. 4. If so, block 292 cools the region temperature to be within the maximum region temperature specified in block 292. In either event, block 295 sends a scroll bar paint event, indicating that the visual appearance of the scroll bar must be changed. This event is received and processed by block 150 of FIG. 5A, as will be discussed later. Flow of control returns to block 201.

While the monitoring program of FIG. 6 is executing, the program of FIG. 5 continues to execute as well. As previously stated, block 115 starts the scroll bar monitoring program of FIG. 6. After block 115 is executed, block 120 asks if the user changed the position in the document. This would normally be done by moving the cursor that marks the position where text or other information can be inserted into the document. If block 120 is answered affirmatively, block 122 repositions the slider (if necessary) in the scroll bar to reflect the new current position.

Regardless of how block 120 is answered, flow of control eventually goes to block 125, which asks if the size of the document has changed. The document size can change either from the addition or deletion of information, such as text. If block 125 is answered affirmatively, block 126 sends a message to update the scroll bar range. This step is conventionally performed by Presentation Manager in the preferred embodiment.

Block 150 then asks if a scroll bar paint event has been received. Scroll bar paint events indicate that the visual appearance of the scroll bar has changed, and can be generated in a conventional manner by Presentation Manager (as part of blocks 122 and 126, for example) or by block 295 of FIG. 6 as part of this invention. If so, block 155 then checks to see if the aging scroll bar feature has been enabled (FIG. 4). If not, conventional scroll bar paint processing is performed, and flow of control skips to block 175. If so, block 160 checks to see which scroll bar mode has been selected (FIG. 4). If the "dirty" scroll bar has been selected, block 165 displays each region contained in scroll data on the scroll bar in a color associated with the region temperature. Temperatures of overlapping regions are added together, and the associated color for these overlapping portions is displayed. The slider used in "dirty" scroll bar mode has a transparent portion so as not to obscure the colors of the scroll bar.

If the "slider" mode is indicated in block 160, block 168 only displays the region(s) under the current slider position in the color associated with the temperature of each region. This mode therefore changes the color of the slider itself and not the scroll bar.

Block 175 asks if the user wants to exit the window. A user normally exits a window by moving the mouse cursor to a special "exit" icon in the window and double clicking the mouse. If block 175 is answered affirmatively, block 180 asks if the user has indicated that any regions created should be saved (FIG. 4). If not, the scroll data in memory 13 is erased in block 182, and will not be available to the user the next time he accesses this document. If block 180 is answered affirmatively, block 181 writes the scroll data associated with this document to storage 14, so it can be reloaded back into memory 13 the next time this document is accessed. Block 185 stops the scroll bar monitoring program of FIG. 6. Block 188 then exits the window in a conventional manner. Block 190 then asks if all windows have been closed. If so, the program ends in block 199. If not, flow of control returns to block 101. For purposes of this patent application, changing documents within a window will be considered to be the same as closing the window and opening a new window.

The discussion thus far has primarily concentrated on a window containing a single vertical scroll bar associated with a document. The same discussion is equally applicable for a window that contains two or more scroll bars. For example, if the document in the window contains image data (i.e. a map of a city), the window would contain a horizontal as well as a vertical scroll bar. Both scroll bars would be independently executing the flowcharts of the programs shown in FIG. 5 and FIG. 6.

While this invention has been described with respect to the preferred embodiment, it will be understood by those skilled in the art that various changes in detail may be made therein without departing from the spirit, scope and teaching of the invention. For example, the actual appearance of the scroll bar may change from what is known today, and it may even be called something completely different, even though it has an equivalent function to the scroll bars known today. Accordingly, the herein disclosed is to be limited only as specified in the following claims.

What is claimed is:

1. A computer system having a display and a scroll bar having a slider, said slider representing a position within a document, said computer system comprising:
    means for detecting a first position, wherein said first position is the current position of said slider;
    means for creating a first region in said scroll bar, said first region having an upper boundary and a lower boundary and including said first position; and
    means for incrementally changing the visual appearance of said first region in said scroll bar as long as said current position remains said first position.

2. The computer system of claim 1, further comprising:
    means for incrementally changing the visual appearance of said first region in said scroll bar when said current position is no longer said first position.

3. The computer system of claim 2 further comprising:
    means for enabling said means for incrementally changing the visual appearance of said first region in said scroll bar when said current position is no longer said first position provided said current position is within said slider.

4. The computer system of claim 1, further comprising:
    means for determining that said first region has reached a predetermined maximum symbolic temperature; and
    means responsive to said determining means which disable said means for incrementally changing the visual appearance of said first region as long as said current position remains said first position.

5. The computer system of claim 2, further comprising:
    means for changing the visual appearance of said first region to be the same as the visual appearance of said scroll bar when said first region reaches a predetermined minimum temperature.

6. The computer system of claim 1, wherein the visual appearance of said first region is a color associated with a specific symbolic temperature that incrementally changes at a predetermined symbolic region heating rate at a predetermined sampling rate.

7. The computer system of claim 6, wherein symbolically warmer temperatures of said region indicate high usage and are represented by colors in the low end of the light spectrum.

8. The computer system of claim 6, further comprising:
    means for allowing a user to select indicators of symbolically warmer and cooler temperatures.

9. The computer system of claim 2, wherein the visual appearance of said first region is a color associated with a specific symbolic temperature that incrementally decreases at a predetermined symbolic region cooling rate at a predetermined sampling rate.

10. The computer system of claim 9, wherein symbolically cooler temperatures of said region indicate low usage and are represented by colors in the high end of the light spectrum.

11. The computer system of claim 1, further comprising:
    means for temporarily suspending said means for incrementally changing the visual appearance of said first region in response to a suspend sampling request; and
    means for resuming said means for incrementally changing the visual appearance of said first region in response to a resume sampling request.

12. The computer system of claim 2, further comprising:
    means for temporarily suspending said means for incrementally changing the visual appearance of said first region in response to a suspend sampling request; and
    means for resuming said means for incrementally changing the visual appearance of said first region in response to a resume sampling request.

13. The computer system of claim 1, further comprising:
    means for detecting that said slider has moved to a second position;
    means for concluding that said second position is not said first position;
    means for creating a second region in said scroll bar, said second region including said second position;
    means for incrementally changing the visual appearance of said second region as long as said second position remains the current position, wherein the visual appearance of said second region is a second color associated with a second specific symbolic temperature that incrementally changes at a predetermined symbolic region heating rate at a predetermined sampling rate; and
    means for incrementally changing the visual appearance of said first region when said first position is no longer the current position, wherein the visual appearance of said first region is a first color associated with a first specific symbolic temperature that incrementally changes at a predetermined symbolic region cooling rate at said predetermined sampling rate.

14. The computer system of claim 13, wherein said first region and said second region have an overlapping portion.

15. The computer system of claim 14, wherein the visual appearance of said overlapping portion is a third color associated with a third temperature, said third temperature being the sum of said first temperature and said second temperature.

16. The computer system of claim 1, further comprising:
    means for saving said first region upon receipt of an indication that work on said document is completed;
    means for restoring said first region upon receipt of an indication that work on said document is to resume.

17. The computer system of claim 1, further comprising:
    means for executing said means for incrementally changing the visual appearance of said first region only if said document exceeds a predetermined minimum size.

18. The computer system of claim 2, further comprising:
    means for executing said means for incrementally changing the visual appearance of said first region only if said document exceeds a predetermined minimum size.

19. A program product having a scroll bar and a slider, said scroll bar having a slider, said slider representing a position within a document, said program product comprising:
    means for detecting a first position, wherein said first position is the current position of said slider;

means for creating a first region in said scroll bar, said first region having an upper boundary and a lower boundary and including said first position; and means for incrementally changing the visual appearance of said first region in said scroll bar as long as said current position remains said first position.

20. A method for creating a visually aging scroll bar, said scroll bar having a slider, said slider representing a position within a document, said method comprising the machine-executed steps of:

detecting a first position, wherein said first position is the current position of said slider;

creating a first region in said scroll bar, said first region having an upper boundary and a lower boundary and including said first position; and incrementally changing the visual appearance of said first region in said scroll bar as long as said current position remains said first position.

\* \* \* \* \*